(No Model.)
L. M. COUCHOUD.
Egg Boiler.
No. 235,998. Patented Dec. 28, 1880.
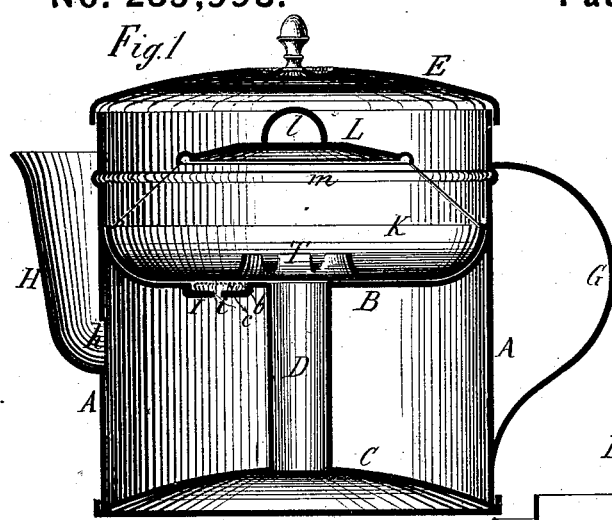
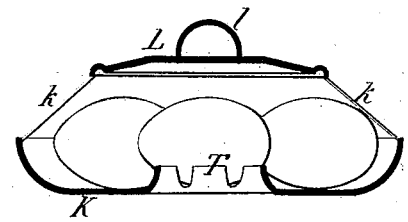
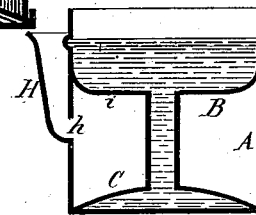
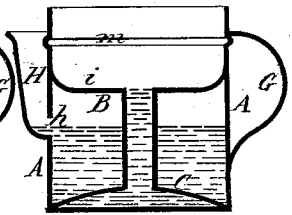
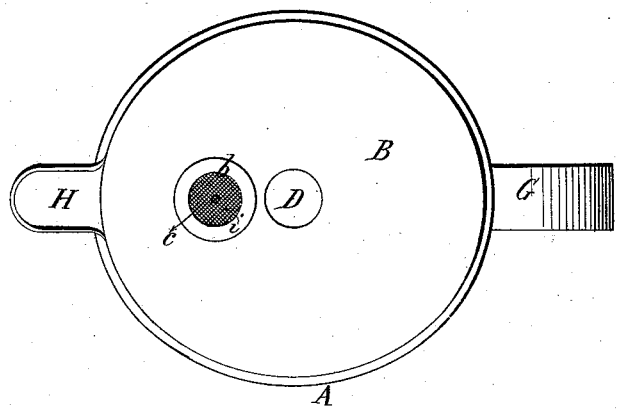
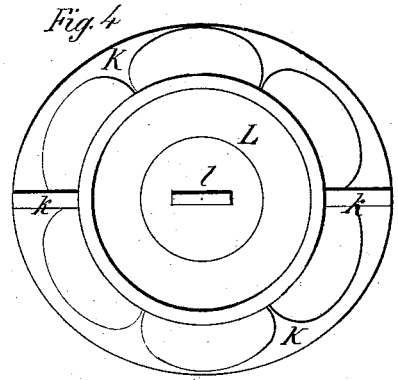
Witnesses:
Philip Mauro
C. J. Hedrick
Inventor:
Louis Marie Couchoud
by A. Pollok
his attorney

UNITED STATES PATENT OFFICE.

LOUIS M. COUCHOUD, OF MARSEILLES, FRANCE.

EGG-BOILER.

SPECIFICATION forming part of Letters Patent No. 235,998, dated December 28, 1880.

Application filed October 30, 1880. (No model.) Patented in France August 22, 1879.

*To all whom it may concern:*

Be it known that I, LOUIS MARIE COUCHOUD, of Marseilles, in the Republic of France, have invented a certain new and useful Improvement in Apparatus for Boiling Eggs, of which improvement the following is a specification.

The object of this invention is to construct an apparatus whereby, without careful watching, eggs can be cooked "soft boiled"—that is to say, may be boiled so that the white is solidified while the yolk remains fluid. This apparatus is called by me the "automatic eggboiler." The eggs, placed in a sort of tray or basket, are introduced into the apparatus filled with boiling water, and after a lapse of about four minutes the apparatus itself indicates that the eggs have been sufficiently cooked, and may be withdrawn from the fire.

In order that the invention and manner of carrying it into effect may be fully understood, the same will now be described in connection with the accompanying drawings, which form a part of this specification.

Figure 1 is a vertical section of the eggboiling apparatus; Fig. 2, a plan view with tray removed; Figs. 3 and 4, respectively, a vertical section and a plan of the egg tray or receptacle; and Figs. 5 and 6, sectional views of the water-vessel, illustrating the operation of the apparatus.

The body A of the apparatus is made of metal, preferably lined, galvanized, or nickel-plated sheet-iron, and is of oval cross-section. The interior is divided into three chambers or compartments by two false bottoms or partitions, B C, the upper and lower chambers being connected by the tube D. The upper partition, B, is concave on its upper surface, and the lower one, C, convex. The middle chamber or compartment is in communication with the spout H by the orifice h.

A cover, E, is used to prevent the entrance of dust into the apparatus when not in use, and a suitable handle, G, of metal or wood, is provided for lifting it.

In the upper partition is formed, at one side of the tube D, a hole, b, which is covered by a metallic strainer or piece of wire-gauze, c, and beneath it is placed a disk, I, preferably of copper, in which is a small hole, i, the size of which is determined with the greatest precision, for the purpose hereinafter explained.

The tray or receptacle which supports the eggs while cooking is formed of a plate, K, struck up or swaged, so as to conform to the concave surface of the partition B. In the center a piece is cut out and the edges of the opening are turned up, as shown at T, so as to retain the eggs. A disk, L, provided with a ring, l, for lifting, is connected, by arms k, with the edges of the plate K. A small annular depression, m, is formed near the top of the vessel A, and serves to indicate the level to which the vessel is to be filled with the boiling water.

The operation is as follows: The vessel A is filled through the mouth with boiling water to the level m, as shown in Fig. 5. The tray or receptacle K, with the eggs to be cooked, is placed on the upper partition, B. The apparatus is then put on the fire and ebullition begins immediately, the water having filled the lower compartment through the tube D, and being directly subjected to the action of the fire. Meantime the water flows slowly from the upper compartment into the intermediate one through the small orifice i, this latter being protected by the wire-gauze or lattice-work c from obstruction by foreign matters. The size of this orifice is such that all the water in the upper chamber will escape into the middle one in about four minutes, (see diagram, Fig. 6,) in which time the cooking will have been completed. The cooking ceases of itself, since the eggs are gradually cooled as the water flows off and leaves them uncovered. When the water has all run out it is time to remove the apparatus, and this fact is indicated by the cessation of the bubbling of the water.

The functions of the different parts of the apparatus will be readily understood.

The opening T in the center of the tray permits the water to pass under it, and the raised edges prevent the eggs from running to the center and coming above the tube D into contact with the jet of boiling water.

The object of the disk L is to prevent the bubbles arising through the tube D from being projected outside the apparatus.

When the cooking is finished and the eggs have been removed the boiler is emptied by pouring out the water through the opening *h* and spout H.

The disk L can be dispensed with and the cover of the apparatus itself utilized to prevent the boiling over of the water. In this case the vapor would be allowed to escape through suitable openings in the cover around the center, which would be left solid to serve in place of the disk L.

Instead of being formed of a solid plate, as shown, the tray could be made of lattice-work or wire-gauze, the edges being raised in the center and then united in the form of a dome. The mark for indicating the level to which the water is to be filled can be altered. There can be a series of marks for different sizes of eggs, if desired.

In using the apparatus the eggs could be placed in the water-vessel and the water poured over them.

I claim—

1. An egg-boiler having a chamber for receiving the eggs and boiling water, and provided with an orifice proportioned, substantially as set forth, to carry off the water in four minutes, or thereabout.

2. An egg-boiling apparatus comprising an egg tray or receptacle and a water-vessel having an upper chamber for receiving the egg-tray, which communicates with a lower chamber by a central tube, and also with an intermediate chamber by an opening calculated to carry off the water from said upper chamber in a definite time, substantially as described.

3. A water-vessel divided by suitable partitions into chambers or compartments, as described, the upper chamber being in free communication with the lower chamber and with the intermediate chamber by an opening of determined size, substantially as described.

4. In combination with a water-vessel divided into chambers, as described, an egg-tray provided with a central opening having raised edges, substantially as described.

5. The egg-tray having a central opening surrounded by raised edges, and having also a disk or top above said opening, substantially as described.

In witness whereof I have signed my name in the presence of two subscribing witnesses.

L. M. COUCHOUD.

Witnesses:
JULES ARMENGAUD, Jr.,
ROBT. M. HOOPER.